United States Patent [19]

Barry et al.

[11] Patent Number: 4,476,714
[45] Date of Patent: Oct. 16, 1984

[54] ENGINE OIL LEVEL SENSOR

[75] Inventors: Leon G. Barry; Willis Rieman, both of Shelby, N.C.

[73] Assignee: Fasco Controls Corporation, Shelby, N.C.

[21] Appl. No.: 534,164

[22] Filed: Sep. 21, 1983

[51] Int. Cl.³ .................. G01F 13/04; G01F 23/22
[52] U.S. Cl. .................................... 73/118; 340/59
[58] Field of Search ................ 73/118, 295, 313; 33/126.7 R; 374/110, 142, 144, 183, 185; 340/59

[56] References Cited

U.S. PATENT DOCUMENTS

| | | | |
|---|---|---|---|
| 3,500,687 | 3/1970 | Smith | 73/295 |
| 3,570,312 | 3/1971 | Kreith | 374/183 |
| 3,890,588 | 6/1975 | Kanaya et al. | 374/185 X |
| 4,186,604 | 2/1980 | Matilla | 73/295 |
| 4,322,713 | 3/1982 | Duck et al. | 340/59 |

FOREIGN PATENT DOCUMENTS 0022948  2/1977  Japan ..................... 73/295

*Primary Examiner*—Jerry W. Myracle
*Attorney, Agent, or Firm*—Shlesinger, Fitzsimmons & Shlesinger

[57] ABSTRACT

The dipstick has an enlarged head and an integral, flexible shank which extends slidably through the dipstick tube of a conventional engine crankcase so that a pair of spaced thermistors, which are mounted on the shank adjacent its inner end, normally will be immersed beneath the level of the oil in the crankcase. The shank contains a ground conductor which is connected adjacent one end to one side of the thermistors, and adjacent its opposite end has sliding, resilient engagement with the inside of the dipstick tube. The opposite sides of the thermistors are connected by two additional conductors which extend upwardly in the shank to register with a pair of openings that are formed in diametrally sides of the shank near the dipstick head. A clamp, which is secured to the outer end of the dipstick tube, carries a pair of spaced terminals, the inner ends of which project through the opposed openings in the dipstick and slidably and resiliently into engagement with the upper ends of the two conductors, when the dipstick is seated in the dipstick tube. The opposite ends of these two terminals are releasably connected to an indicator circuit which produces an alarm signal when the temperature differential detected by the two thermistors exceeds a predetermined value.

14 Claims, 4 Drawing Figures

ENGINE OIL LEVEL SENSOR

BACKGROUND OF THE INVENTION

This invention relates to liquid level sensors, and more particularly to an improved device for sensing the level of a fluid in an automotive engine or the like. Even more particularly, this invention relates to a novel dipstick which incorporates electrical means for sensing the level of the oil in the engine block or crackcase of an automotive vehicle.

From their early inception, most automobile engines have included a conventional metal dipstick for manually checking the level of the lubricating oil in the engine block. In recent years efforts have been made to provide improved sticks, such as for example those having electrical sensing means for indicating the level of the oil in the block. For example, U.S. Pat. No. 4,186,604 suggests the use of a helically coiled strand, which is adapted to be inserted in the engine block dipstick tube in place of the conventional dipstick. A thermistor, which is secured to the lower end of the coiled strand, is connected to an electric circuit that provides a visual indication of when the oil in the block has dropped below a predetermined level. This invention was alleged to have been an improvement over the known practice of using heat shrinkable tubing to attach a thermistor to a lower end of a conventional dipstick.

U.S. Pat. No. 3,098,914 also suggests the use of a single, temperature-responsive thermistor switch on a transmission dipstick for detecting the level of oil in an automatic transmission. When the level of fluid in the transmission level drops below a predetermined height, a switch closes to actuate a warning light on the dashboard of the vehicle. If the level is high enough to cover the switch, the switch opens once the oil has been warmed up by driving the auto. In this mechanism the switch is merely secured to the side of a conventional dipstick, as are the wires which are employed for connecting the switch to the temperature-responsive circuit.

U.S. Pat. No. 2,780,692 discloses a specially shaped transmission dipstick having a perforated tubular member attached to the lower end thereof. A float, which shifts up and down in the tubular member in response to changes in the level of the transmission fluid, controls the operation of a switch that controls a warning device.

Although not specifically designed for an automotive engine block or transmission, the liquid level detector disclosed in U.S. Pat. No. 3,500,687 employs two spaced thermistors, which are mounted in a housing that extends downwardly into a reservoir to monitor the amount of liquid in the reservoir. When the liquid in the reservoir falls below a predetermined level, the upper thermistor begins to heat up, thereby to operate a first warning lamp. If the liquid falls below the second thermistor a second warning lamp is illuminated.

While the above-noted patents disclose various ways of utilizing thermistors for sensing the level of fluids, most such devices are either impractical or do not provide the accuracy which is desirable for proper monitoring of the oil level in automobiles and the like. For example, if a single thermistor is employed it is likely to give an erratic indication of the true level of the oil in the enginer block, as for example when the oil sloshes or shifts and momentarily exposes the thermistor, thus causing energization of the associated warning device even though the true level of the oil might be satisfactory. Although the above-noted U.S. Pat. No. 3,500,687 discloses a circuit which would miniminize this problem, nevertheless this particular patent does not disclose a satisfactory device for retrofitting a conventional automotive dipstick with an electrically operated sensor.

Still another disadvantage of prior art devices such as those referred to above is that, in most cases where electrically operated sensing devices have been incorporated in dipsticks, such devices are effective only during certain operating conditions of an automobile vehicle, and are not reliable at other times.

It is an object of this invention, therefore, to provide an improved engine oil level sensor of the type which includes electrical sensing means, and which enables either automatic or manual checking of the oil level in the engine.

Another object of this invention is to provide an improved oil level dipstick and electrical sensor therefor which are relatively inexpensive to manufacture, and which can be readily substituted in place of conventional automotive engine dipsticks.

Still another object of this invention is to provide an improved dipstick of the type described, which is adapted to be removably inserted in the dipstick tube of an engine block for ready removal and manual inspection, and which has incorporated therein electrical sensing means for providing automatic monitoring of the level of the oil in the block.

SUMMARY OF THE INVENTION

A plastic clamp is releasably attachable to the upper end of the dipstick tube of an automobile crankcase or the like. An elongate, plastic dipstick, which is nearly rectangular in cross section, is releasably insertable through an opening in the clamp to replace the conventional, metal dipstock. Two thermistors, which are secured in axially spaced openings in the lower end of the plastic dipstick, are engaged at one side with a dipstick conductor which grounds on the dipstick tube, and at their opposite sides are connected by springs to the respective lower ends of two further dipstick conductors which project at their upper ends through tbe plastic clamp and into the head of the dipstick.

Two brass terminals, which are secured in a socket at one side of the clamp, have two inner ends which project into the bore in the clamp to have sliding contact with the two additional dipstick conductors adjacent their upper ends, when the dipstock is properly inserted into the dipstick tube. The opposite ends of the two terminals are releasably engagable in the socket with a conventional receptacle (not illustrated) which forms part of an indicator circuit that includes a Wheatstone bridge.

When the two terminals are connected to the receptacle, the two thermistors are connected in parallal to the automobile battery, and to opposite sides of the Wheatstone bridge. As long as the two thermistors, which have negative temperature coefficients, remain immersed in the crankcase oil, they are maintained at equal temperatures so that the Wheatstone bridge circuit remains balanced. However, when the oil level falls low enough to cause the upper thermistor no longer to be immersed in the oil, the temperature of this thermistor will begin to raise, thus lowering its resistance to a point where the bridge circuit will become unbalanced and will therefore energize an alarm or warning device.

THE DRAWINGS

DETAILED DESCRIPTION OF THE PREFERRED EMBODIMENTS

Figure 1:
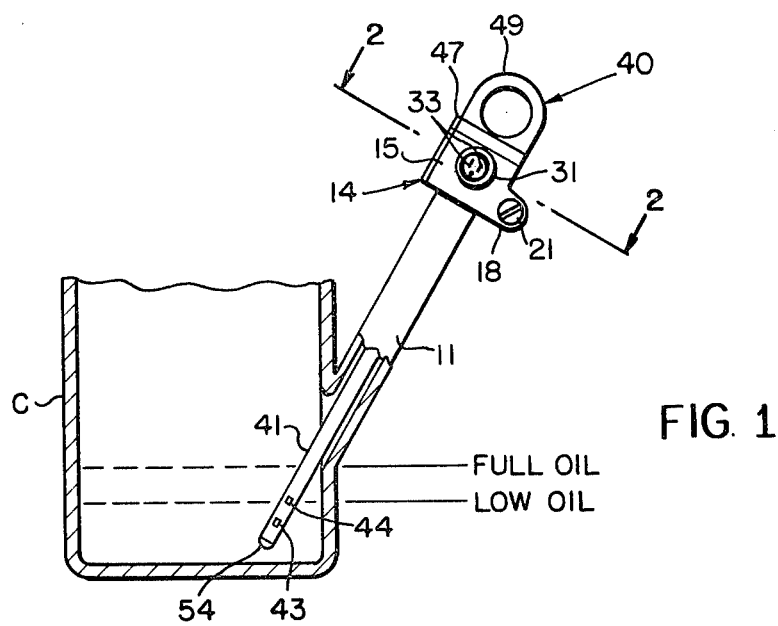
FIG. 1 is a fragmentary elevational view of an automotive crankcase or engine block having mounted thereon part of an improved oil level sensor made according to one embodiment of this invention, portions of the crankcase and its dipstick tube being cut away and shown in section for purposes of illustration.

Referring now to the drawings by numerals of reference, and first to FIG. 1, C denotes an engine crankcase or the like, which is illustrated only diagramatically, and which is adapted to function as the reservoir for the engine lubricating oil. Projecting from the side of crankcase C is the usual dipstick tube 11, which is adapted normally to accommodate a removable dipstick of the conventional variety (not illustrated). Tube 11, which is inclined to the sidewall of the crankcase C, opens at its lower end in the crankcase C and is surrounded at its upper end by an outwardly flaring, circumferential collar 12 (FIG. 3).

Secured adjacent its lower end around the upper end 12 of tube 11 is a dipstick tube clamp, which is denoted generally in the drawings by the numeral 14. Clamp 14, which may be made from a plastic material, comprises two mating, generally semi-cylindrical halves or sections 15 and 16, which at one side of the clamp (the left side in FIG. 2) have two, confronting, longitudinal side edges thereof interconnected by an integral hinge section 17 in the form of an interconnecting web of reduced thickness. Ingegral with and projecting laterally beyond the other two confronting side edges of clamp sections 15 and 16 adjacent the lower ends thereof are two, similarly shaped lugs or projections 18 and 19, respectively, which are releasably secured together by a removable bolt or screw 21.

Figure 2:
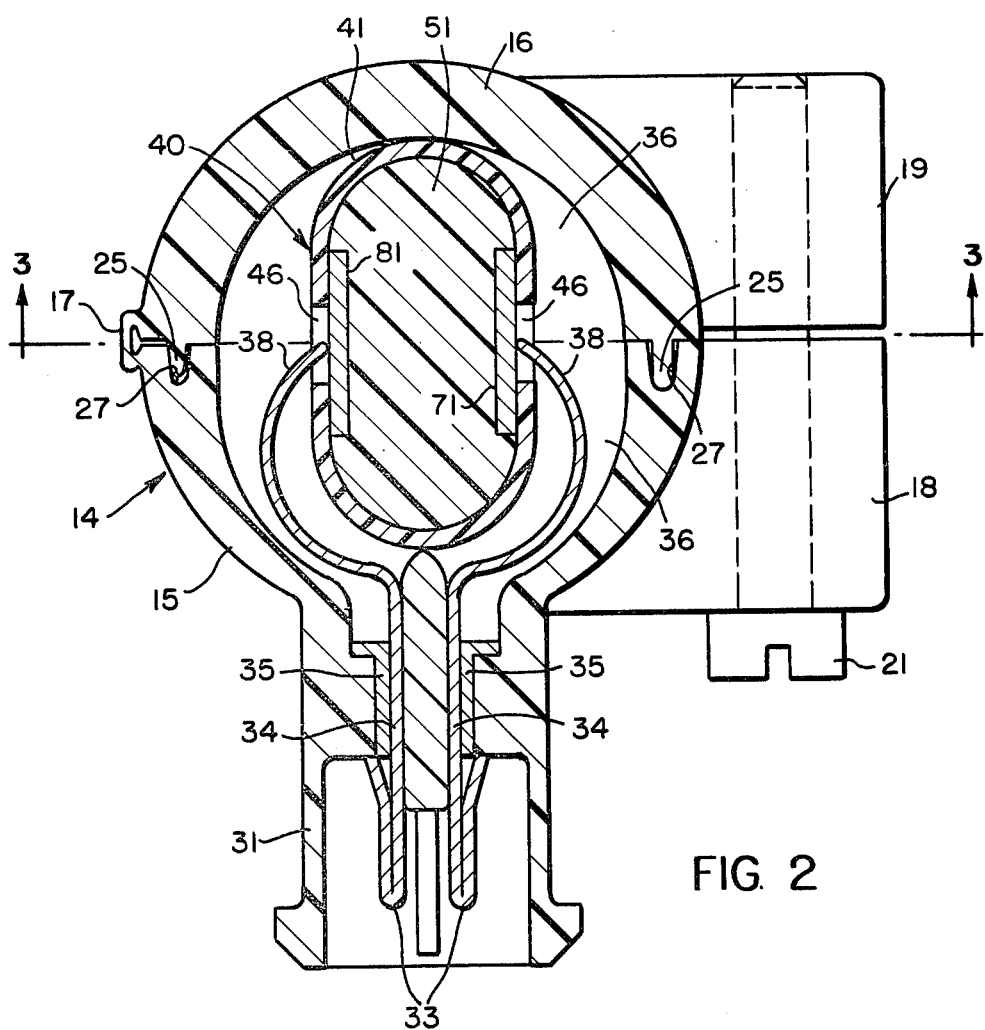
FIG. 2 is an enlarged, fragmentary sectional view taken generally along the line 2—2 in FIG. 1 looking in the direction of the arrows.
Figure 3:
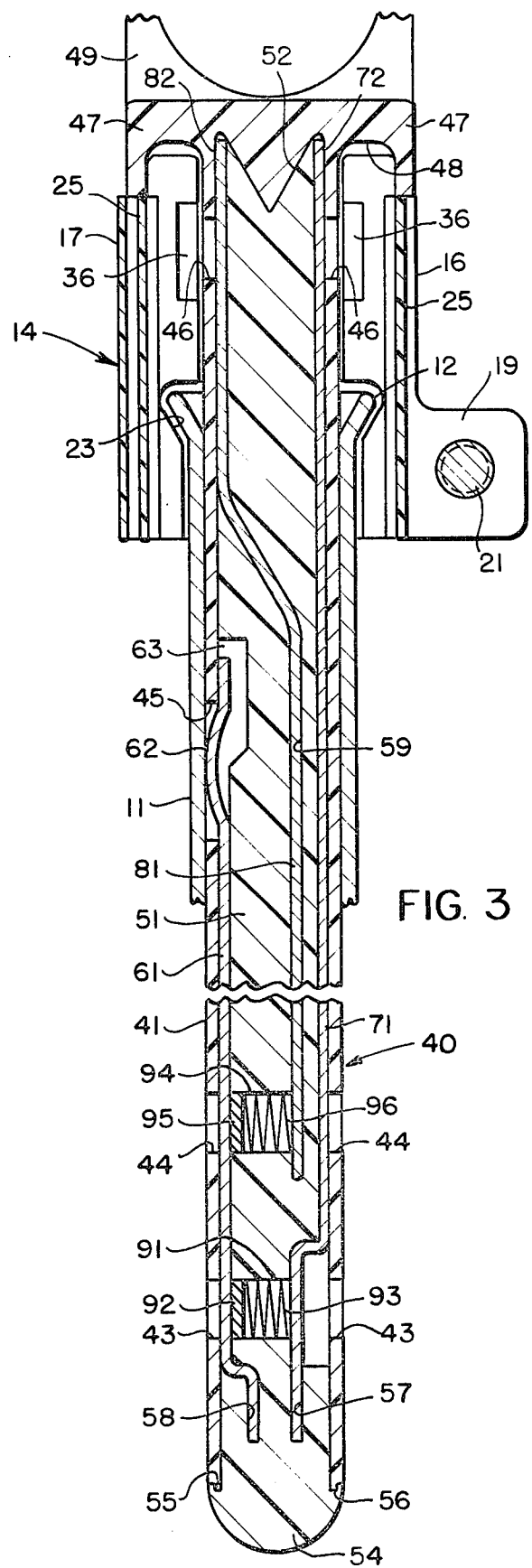
FIG. 3 is a fragmentary sectional view, on a slightly smaller scale, taken along the line 3—3 in FIG. 2 looking in the direction of the arrows, with the engine dipstick tube being shown fragmentarily and in section.

When the clamp 14 is secured on the upper end of the dipstick tube 11 as shown in FIGS. 1-3, the circumferential shoulder 12 on the upper end of the tube is surrounded by, and is releasably enclosed within, mating, arcuate recesses 23 that are formed in the confronting surfaces of the clamp sections 15 and 16 adjacent to the lower ends thereof, and only one of which recesses is shown in FIG. 3. Also at this time, longitudinally extending projections or bosses 25 (FIGS. 2 and 3), which are formed on the longitudinal side edges of the clamp section 16, are seated in registering notches or recesses 27, which are formed in the confronting surfaces of the clamp section 15, thereby to assist in preventing the sections 15 and 16 from shifting laterally relative to one another, when the clamp is in use.

Projecting centrally from the back of clamp section 15 above its lug 18 is an integral, tubular socket 31, which surrounds the folded, spade shaped ends of a pair of spring brass terminals 34 (FIG. 2), which are secured intermediate their ends by stakes 35 in spaced openings formed in the inner end of socket 31. The opposite ends of the terminals 34 project into registering recesses 36 formed in the confronting surfaces of the clamp sections 15 and 16, and are curved inwardly toward each other as at 38 (FIG. 2) for purposes noted hereinafter.

Removably mounted in the dipstick tube 11 is a novel dipstick, which is denoted generally by the numeral 40. This stick comprises an elongate, flexible casing or tube 41, which may be made from a high temperature thermoplastic material, and which is nearly rectangular in cross section as shown in FIG. 2. Adjacent its lower end tube 41 has in opposite sides thereof two axially spaced pairs of diametrally opposed ports or openings 43 and 44. Intermediate its ends the tube 41 has in one side thereof a small, axially extending slot 45; and adjacent its upper end has in opposite sides thereof a pair of opposed, rectangularly shaped openings 46 (FIGS. 2 and 3) the purpose of which is described hereinafter. Above the openings 46 tube 41 has formed thereon a cylindrical head portion 47 (FIGS. 1 and 3), which has in its underside a circumferential recess 48 that is releasably engagable over the upper end of clamp 40. Projecting from the top of head portion 47 is an integral, centrally-bored finger grip 49, which is used to withdraw the dipstick 40 from tube 11.

Secured in the bore of tube 41 is an elongate, plastic core 51, which may be made of the same material as the tube 41. Core 51 has a notch or recess 52 (FIG. 3) in its upper end seated against a mating projection that extends from the underside of the head portion 47 of the tube 41 centrally thereof. The lower end of core 51 has formed thereon a rounded head section 54, which is secured by ultrasonic welding or the like to the lower end of tube 41 so that a recess 55 in section 54 is seated over and surrounds a narrow flange 56 that projects from the lower end of tube 41.

Secured at one end in a notch or recess 58 formed in the core 51 above its head 54, and extending upwardly along one side of the core (the left side as shown in FIG. 3) in confronting relation to the inside surface of tube 41, is an elongate metal conductor or ground terminal 61. Adjacent its upper end conductor 61 has formed thereon a bowed or curved contact portion 62, which registers intermediate its ends with the slot 45 in tube 41, and adjacent its upper end with a recess 63 formed in the confronting side of the core 51. Conductor 61 also registers adjacent its lower end with two ports 43 and 44 formed in one side of the tube 41 (the left side thereof as shown in FIG. 3).

Secured in its lower end in another notch or recess 57 formed in the core 51 adjacent its lower end, and adjacent the side thereof opposite to the terminal 61, is another, elongate metal conductor or terminal 71, which extends upwardly along the side of core 51 opposite the terminal 61, and between the core and the surrounding tube 41. Conductor 71 extends all the way up in the tube 41 to a point immediately beneath the head section 47, so that a portion thereof registers with the opening 46 formed on one side of tube 41 (the right side in FIG. 3), and so that its upper end 72 is seated in a recess in the underside of the tube section 47. Adjacent its lower end two axially spaced portions of conductor 71 register with the ports or openings 43 and 44 that are formed in the side of the tube 41 opposite to those ports which registers with the terminal 61.

Secured adjacent its lower end in an elongate, axially extending recess 59, which is formed in the approximate center of the core 51, is another, elongate metal conductor or terminal 81. Adjacent its upper end conductor 81 is bent or curved to extend outwardly above the core 5 recess 63, and then vertically along the same side of core 51 as conductor 61. The upper end 82 of conductor 81 also terminates in a recess in the underside of the head portion 47 of the tube 41 in spaced relation to the upper end 72 of the conductor 71. Also, a portion of conductor 81 adjacent its upper end registers with and faces upon the opening 46 in tube 41 opposite to the opening 46 which registers with conductor 71.

As a result of the above-described construction, when the dipstick 40 is properly seated in tube 41 as shown in the drawings, the curved ends 38 of the spring terminals 34 project through the openings 46 in the tube 41, and into sliding contact with those portions of the conductors 71 and 81 that register with the tube openings 46. Also at such time, the contact 62 on conductor 61 will be slidably engaged with the crankcase tube 11.

Mounted in an opening 91 formed in the core 51 to register with the tube openings 43 is a conventional thermistor 92, which is resiliently urged against the inside surface of the conductor 61 adjacent its lower end by a metal spring 93, which is interposed between the thermistor 92 and the lower end of the conductor 71. Mounted in another opening 94 formed in core 51 to register with the tube openings 44, is a second thermistor 95, which is also resiliently urged against the inside surface of the conductor 61 by another metal spring 96, which is interposed between thermistor 95 and the lower end of conductor 81. For purposes of this invention, each of the thermistors has a negative temperature coefficient, so that its resistance to current flow falls as its temperature rises.

When the dipstick 40 is inserted into the dipstick tube 11, the two thermistors 92 and 95 are grounded at one side by conductor 61, its contact 62 and the dipstick tube 11 on the automobile frame. Moreover, the two curved ends 38 of the spring contacts 34, as noted above, will be engaged with the conductors 71 and 81, while the lower ends of the latter will be connected by the springs 93 and 96 with the opposite sides of the thermistors 92 and 95, respectively. Also at this time the ports 43 and 44 in the tube 41 permit oil in the crankcase to come into contact with portions of the conductors 61 and 71, thus enhancing the transfer of heat from the oil to the thermistors 92 and 95. Consequently, as long as the thermistors remain below the level of the oil in the crankcase C they will be maintained at equal temperatures—i.e., at the temperature of the oil in the crankcase, or at least at uniform temperatures relative to the temperature of the oil in the crankcase.

Figure 4:
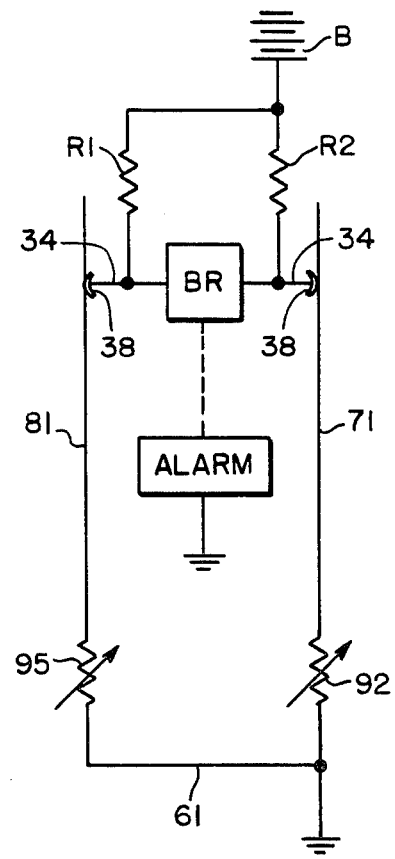
FIG. 4 is a wiring diagram illustrating one manner in which the thermistors, which form part of the sensor, can be wired for operation.

One manner in which these thermistors can be connected in a circuit for detecting the level of the oil in crankcase C is illustrated in FIG. 4. As illustrated in this figure, the two thermistors 92 and 95 are connected at one side by the conductor 61 to ground, and at their opposite sides by the conductors 71 and 81, respectively, to the curved ends 38 of the contacts 34. In practice, the ends 33 of these two contacts can be releasably connected in conventional manner to a Wheatstone bridge circuit, which is denoted at FIG. 4 at BR. Power to the circuit BR and to the associated thermistors 92 and 95 is supplied through a pair of limit resistors R1 and R2 from the positive terminal of the automobile battery, which is denoted at B.

When both thermistors 92 and 95 are immersed in the oil, the heat dissipated by them is sinked away by the oil, and both are maintained at substantially the same temperature. Consequently, the voltages at the curved ends 38 of the contacts 34 are substantially the same, so that the bridge circuit BR is balanced. However, when the upper thermistor 95 is out of the oil, so as to be exposed to air in the space above the level of the oil in the crankcase C, and assuming that the lower thermistor 92 is still submerged in the oil, then the temperature of the upper thermistor 95 will begin to increase, thus causing a decrease in its resistance. This creates an imbalance in the bridge circuit BR, which in turn is connected in a conventional manner to an alarm, which indicates that the level of the oil in the crankcase has fallen below a safe level and should be replenished.

Since it obviously takes some time for the temperature of the upper thermistor 95 to increase to a point where its lowered resistance causes an imbalance of the bridge circuit BR sufficient to trigger the alarm, the alarm will not be energized each time thermistor 95 is momentarily exposed to the crankcase air. Thus the circuit provides some immunity from accidentally triggering the alarm when, for example, the oil is sloshing around in the crankcase and only periodically places the upper thermistor 95 out of the oil. Moreover, since two thermistors are used, the system is not dependent solely on the temperature of the oil, but only on an unbalanced condition, such as when the upper thermistor is out of the oil, while the lower thermistor is immersed in the oil. This permits the alarm system to function properly at all times, whether the engine happens to be warm or cold.

In practice the dipstick 40 may have the usual "add oil" graduations printed on the outside of tube 41, such as for example an indication located adjacent the opening 44 in FIG. 1 to denote that the oil is down 1 quart. The "down 2 qts." indication would register, for example, with the lower opening 43 so that the alarm would be energized whenever the oil level dropped approximately two quarts from its full level.

From the foregoing it will be apparent that the present invention provides a novel dipstick, which incorporates a very stable electric circuit for sensing the level of oil in a crankcase, and relatively simple and inexpensive means for readily adapting or retrofitting the dipstick to a conventional automobile dipstick tube. The level of the oil can thus be monitored both by virtue of the electrical circuit means, and also simply by pulling the dipstick 40 out of the dipstick tube 11 to inspect the graduations on its outer surface. The BR circuitry and power supply can be readily removed from the socket 31 merely by unplugging its associated plug (not illustrated) from the probes 33, after which the dipstick can be inserted and/or removed from the tube 11 as desired. Whenever the dipstock 40 is reinserted in the tube 11, the BR circuitry can once again be replugged into the socket 31.

As noted above, one of the major advantages of this improved sensor is that it includes a built-in thermal time delay, so that temporary loss of oil around the upper thermistor (by sloshing or the like) will not give nuisance indications of low oil. Moreover, unlike some liquid level sensing devices, this sensor is not dependent upon the electrical conductivity of the oil, nor upon its clarity. In other words, the sensor will operate just as well with new or old oil, clean or dirty, clear or opaque oil. Also the system is operable independently of the oil temperature, since it is only the difference in the temperatures of the two thermistors which is significant. Furthermore, the system involves no moving parts nor any floats or mechanically operated switches which might become jammed or otherwise inoperative during use. The sensing circuit itself is separable from the dipstick so that it can be easily removed if required. Also, since it merely needs a clamp for insertion over the upper end of the dipstick tube, the system is easily retrofitted to existing vehicles. In the event that both thermistors 92 and 95 are no longer immersed in oil, the voltage drops across the resistors R1 and R2 will have increased by equal amounts, and this phenomenon may be used in any conventional manner to trigger still another type of alarm, if desired.

While this invention has been illustrated and described in detail in connection with only certain embodiments thereof, it will be apparent that it is capable of further modification, and that this application is intended to cover any such modifications as may fall within the scope of one skilled in the art or the appended claims.

What we claim is:

1. A fluid level sensor for a reservoir of the type having thereon an integral tube, which opens at its inner end on the reservoir, and at its outer end above the reservoir, comprising an elongate dipstick removably mounted in said tube, and having thereon a stem portion projecting slidably through the bore in the tube and into the interior of said reservoir normally to have the inner end thereof immersed a first predetermined distance below the level of the fluid in the reservoir, when the fluid is at its desired level, a pair of spaced, temperature sensitive elements mounted on said stem portion adjacent said inner end thereof normally to extend second and third distances, respectively, beneath the desired level of fluid in the reservoir, and corresponding, respectively, to low and excessively low levels of the fluid in said reservoir, and means including an electrical indicator circuit connected to said elements and operative to produce a warning signal when the difference in the ambient temperatures sensed by said two elements exceeds a predetermined value, said means comprising at least one electrical contact on said stem portion slidably engagable with said tube for completing an electrical connection between said elements and said indicator circuit, when said dipstick is mounted in said tube, and for interrupting said connection, when said dipstick is removed from said tube.

2. A fluid level sensor as defined in claim 1, wherein said elements are thermistors and said means further comprises a first conductor mounted on said stem portion and electrically connected adjacent one end thereof with one side of each of said thermistors, said contact being formed on said first conductor adjacent the opposite end thereof, and being slidably engagable with the inside of said tube, when the dipstick is mounted therein, thereby to ground said one sides of said termistors on said tube, two additional conductors on said stem portion, each of which is electrically connected adjacent one end thereof with the opposite side of one of said thermistors, and a pair of spaced terminals mounted on said tube adjacent the outer end thereof each to be releasably engagable at one end thereof with the opposite end of one of said additional conductors, said spaced terminals being disposed to be releasably connected at their opposite ends to said indicator circuit.

3. A fluid level sensor as defined in claim 2, wherein said stem portion of said dipstick comprises a tubular section integral at one end with a head portion of the dipstick, a core is secured in the bore of said tubular section, and each of said conductors is secured at said one end thereof in said core and projects adjacent said opposite end thereof along the outside of said core in confronting relation to the inner peripheral surface of said tubular section.

4. A fluid level sensor as defined in claim 3, wherein each of said thermistors is mounted in one of two axially spaced recesses in said core and is engaged at one side thereof with said first conductor, and is connected at its opposite side by a spring to one of said additional conductors.

5. A fluid level sensor as defined in claim 4, wherein said tubular section has two axially spaced pairs of diametrally opposed openings formed in its annular wall to register, respectively, with said axially spaced recesses in said core.

6. A fluid level sensor as defined in claim 3, wherein said stem portion of said dipstick is generally oval in cross sectional configuration, said additional conductors extend adjacent said opposite ends thereof along opposite sides, respectively, of said stem portion, and said one ends of said terminal project through registering openings in opposite sides of said tubular section and resiliently into engagement with said two additional conductors.

7. A fluid level sensor as defined in claim 3, wherein said tubular section and said core are made from a flexible, plastic material.

8. A fluid level sensor as defined in claim 2, wherein a clamp is releasably attached to the outer end of said tube and has therethrough a central opening registering with the bore in said tube, said dipstick has an enlarged diameter head portion integral with the outer end of said stem portion thereof and engagable with said clamp, when said dipstick is fully seated in said tube, said pair of spaced terminals are mounted on said clamp to project at said one ends thereof into said central opening in said clamp adjacent opposite thereof, and said two additional conductors extend at said opposite ends thereof into said central opening in said clamp releasably to be engaged therein by said one ends of said terminals.

9. A fluid level sensor as defined in claim 8, wherein said one ends of said terminals are curved inwardly toward one another resiliently to engage against said additional conductors when said dipstick is fully seated in said tube.

10. A fluid level sensor as defined in claim 8, wherein a socket is formed in one side of said clamp and opens at one end on the exterior of said clamp, and said pair of spaced terminals are secured intermediate their ends in said socket to project at said one ends thereof into said central opening and at their opposite ends into said open end of said socket for connection releasably to a plug forming part of said indicator circuit.

11. A fluid level sensor as defined in claim 1, wherein said stem portion of said dipstick has graduations on the exterior thereof to indicate the level of the fluid in said reservoir, and said means includes an electrical socket secured on said tube for releasably accommodating an electric plug that forms part of said indicator circuit, and which plug is removable manually from said socket to permit withdrawal of said dipstick from said tube and manual inspection of the graduations thereon.

12. A device for measuring the level of oil in an engine crankcase housing of the type having a dipstick tube projecting at its outer end from one side of the housing, comprising an elongate dipstick releasably and slidably mounted in said tube with the inner end thereof disposed to extend into the oil in said housing, a pair of axially spaced thermistors secured in said dipstick adjacent the inner end thereof, and disposed to be immersed in the oil in said housing when the oil is at a satisfactory level, a pair of spaced, electrical terminals fixed on said tube adjacent its outer end, each of said terminals projecting at one end thereof slidably into engagement with said dipstick adjacent diametrally opposite sides thereof, when said dipstick is seated in said tube, means for automatically connecting one side of each of said thermistors to ground, when said dipstick is in said tube, and for disconnecting said one sides from ground, when said dipstick is removed from said tube, and a pair of conductors in said dipstick, and each of which is electrically connected at one end to the opposite side of one of said thermistors, and each of which registers adjacent its opposite end with an opening in said dipstick thereby to be engaged by said one end of one of said terminals, when the dipstick is seated in said tube, said terminals being disposed to have the opposite ends thereof releasably connected to a circuit which is operative to produce a warning signal when the difference in the temperatures sensed by said thermistors exceeds a predetermined value.

13. A device as defined in claim 12, wherein said means comprises a further conductor mounted in said dipstick with one end thereof connected to said one sides of said thermistors, and with the opposite end thereof projecting from one side of said dipstick resiliently and slidably to engage said tube when the dipstick is seated therein.

14. A device as defined in claim 13, including a clamp releasably secured to the outer end of said tube and having formed in one side thereof a socket, the open end of which faces on the exterior of said clamp, said terminals being secured intermediate their ends in said clamp to project at said one ends thereof into a central opening in said clamp for engagement with said dipstick, and projecting at said opposite ends thereof into said open end of said socket.

* * * * *